United States Patent
Welsch et al.

(10) Patent No.: US 11,085,796 B2
(45) Date of Patent: Aug. 10, 2021

(54) SENSOR DEVICE

(71) Applicant: Robert Bosch GmbH, Stuttgart (DE)

(72) Inventors: Wolfgang Welsch, Heidelberg (DE); Michael Kleinknecht, Lehrensteinsfeld (DE); Sina Fella, Langenbrettach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/482,841

(22) PCT Filed: Feb. 7, 2018

(86) PCT No.: PCT/EP2018/053060
§ 371 (c)(1),
(2) Date: Aug. 1, 2019

(87) PCT Pub. No.: WO2018/149712
PCT Pub. Date: Aug. 23, 2018

(65) Prior Publication Data
US 2019/0346290 A1 Nov. 14, 2019

(30) Foreign Application Priority Data
Feb. 15, 2017 (DE) ...................... 10 2017 202 365.1

(51) Int. Cl.
*G01B 7/14* (2006.01)
*G01B 7/30* (2006.01)
(Continued)

(52) U.S. Cl.
CPC ............ *G01D 5/2451* (2013.01); *G01D 5/12* (2013.01); *G01D 5/14* (2013.01); *G01D 5/145* (2013.01);
(Continued)

(58) Field of Classification Search
CPC .......... G01D 5/145; G01D 5/14; G01D 5/147; G01D 5/12; G01D 5/2451; G01B 7/003; G01B 7/14; G01B 7/30; G01B 11/26
(Continued)

(56) References Cited

U.S. PATENT DOCUMENTS 5,313,182 A 5/1994 Blache
2002/0079888 A1 6/2002 Frissen et al.
(Continued)

FOREIGN PATENT DOCUMENTS

CN 101416020 A 4/2009
DE 199 37 206 C2 12/2000
(Continued)

OTHER PUBLICATIONS

International Search Report corresponding to PCT Application No. PCT/EP2018/053060, dated Mar. 16, 2018 (German and English language document) (7 pages).

*Primary Examiner* — Raul J Rios Russo
(74) *Attorney, Agent, or Firm* — Maginot, Moore & Beck LLP

(57) ABSTRACT

A sensor device includes an encoder element and at least two housing-affixed, magnetic field-sensitive sensors. The encoder element can be displaced in a direction of movement. The sensors are configured to determine a position and/or movement of the encoder element. The encoder element has a first magnet arrangement, which has differently aligned magnetic fields along the direction of movement of the encoder element, and a second magnet arrangement, which has differently aligned magnetic fields along the direction of movement of the encoder element.

15 Claims, 1 Drawing Sheet

(51) Int. Cl.
*G01R 33/02* (2006.01)
*G01D 5/245* (2006.01)
*G01D 5/14* (2006.01)
*G01D 5/12* (2006.01)
*G01B 7/00* (2006.01)
*G01B 11/26* (2006.01)

(52) U.S. Cl.
CPC ............ *G01D 5/147* (2013.01); *G01B 7/003* (2013.01); *G01B 7/14* (2013.01); *G01B 7/30* (2013.01); *G01B 11/26* (2013.01)

(58) Field of Classification Search
USPC .................. 324/51, 55, 200, 207.11, 207.13
See application file for complete search history.

(56) References Cited

U.S. PATENT DOCUMENTS

| | | | |
|---|---|---|---|
| 2003/0145663 | A1 | 8/2003 | Heisenberg et al. |
| 2011/0103173 | A1* | 5/2011 | May ........................ G01L 3/103 366/64 |
| 2012/0153946 | A1* | 6/2012 | van Veldhoven .... G01D 5/2451 324/252 |
| 2014/0197820 | A1* | 7/2014 | Ritter ..................... G01D 5/145 324/207.13 |
| 2015/0354984 | A1 | 12/2015 | Albrecht |
| 2017/0191851 | A1* | 7/2017 | Hill ......................... G01D 5/14 |

FOREIGN PATENT DOCUMENTS

| | | |
|---|---|---|
| DE | 10 2009 055 104 A1 | 6/2011 |
| DE | 10 2011 083 948 A1 | 4/2013 |
| EP | 0 997 706 B1 | 5/2000 |
| JP | H06-088702 A | 3/1994 |
| JP | H10-061664 A | 3/1998 |
| JP | 2003-516534 A | 5/2003 |
| JP | 2004-516799 A | 6/2004 |
| JP | 2009-528530 A | 8/2009 |

\* cited by examiner

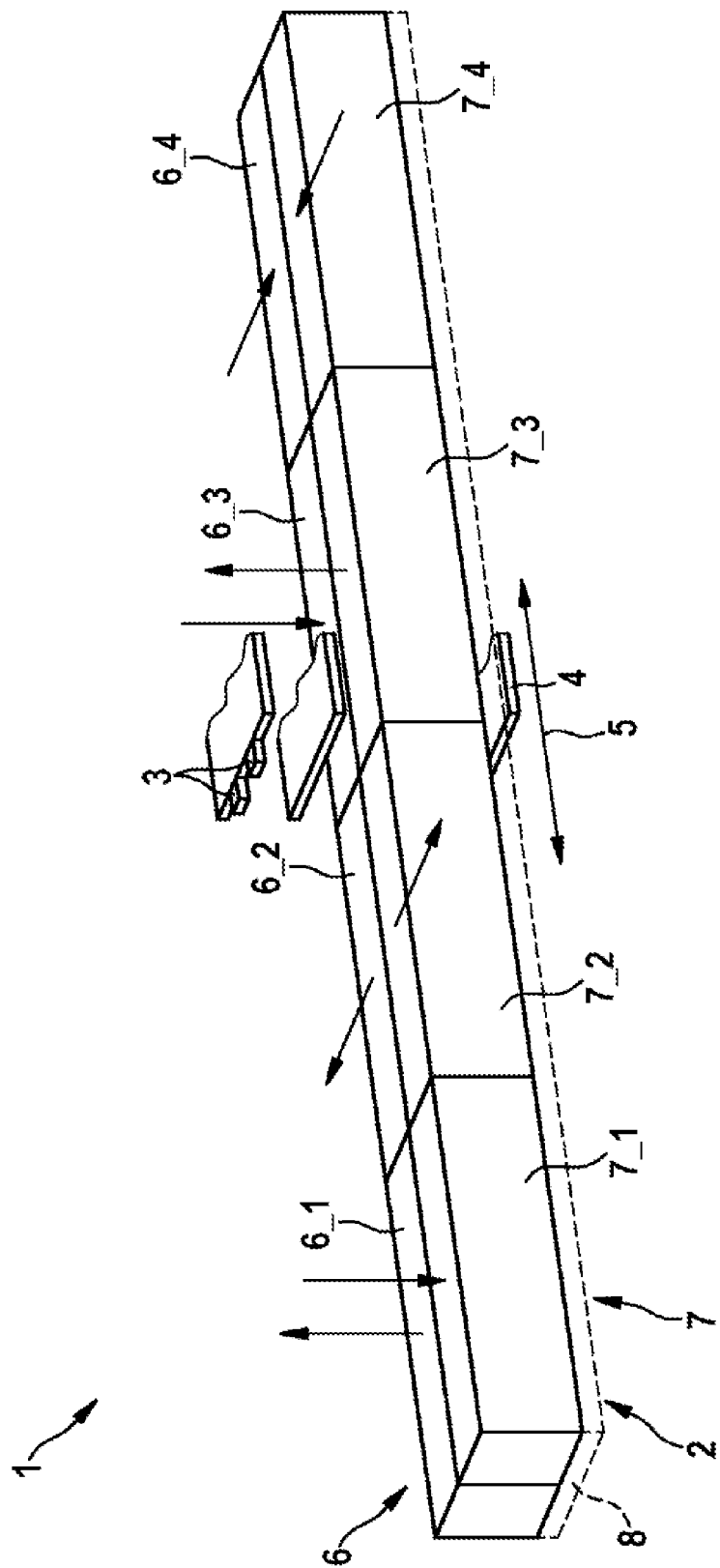

SENSOR DEVICE

This application is a 35 U.S.C. § 371 National Stage Application of PCT/EP2018/053060, filed on Feb. 7, 2018, which claims the benefit of priority to Serial No. DE 10 2017 202 365.1, filed on Feb. 15, 2017 in Germany, the disclosures of which are incorporated herein by reference in their entirety.

The disclosure relates to a sensor device having an encoder element, which can be displaced, in particular in only one direction of movement, and having at least two housing-affixed, magnetic field-sensitive sensors for determining a position and/or displacement of the encoder element, wherein the encoder element has a first magnet arrangement which has differently aligned magnetic fields along the direction of movement of the encoder element.

BACKGROUND

Sensor devices of the aforementioned type are already known from the prior art. Thus, for example, the unexamined application DE 199 37 206 C2 discloses a sensor device with a magnet arrangement consisting of a plurality of magnets, whose north and south poles are aligned differently, so that differently oriented magnetic fields are produced along the magnet arrangement. Two magnet-sensitive sensors are used to detect the magnetic fields, wherein the ratio of the output signals of the sensors to each other is set so as to obtain a sum and/or difference signal, from which the position of the magnet arrangement in relation to the sensors can be determined. Similar sensor devices can also already be found in DE 10 2009 055 104 A1, as well as EP 0 997 706 B1.

SUMMARY

The sensor device according to the disclosure has the advantage that the position of the encoder element can be uniquely detected independently of an external homogeneous stray magnetic field. The design of the sensor device according to the disclosure enables large measurement distances to be achieved, and also a constant output signal in the so-called clamping range. According to the disclosure therefore, it is provided that the encoder element has a second magnet arrangement, which has differently aligned magnetic fields along the direction of movement of the encoder element. There are therefore two magnet arrangements present, which have different magnetic field orientations along the direction of movement of the encoder element. This arrangement provides that the magnetic arrangements have different orientations along the encoder element. By means of an appropriate positioning of the sensors then, in the case of a displacement, in particular a movement, of the encoder element in the direction of movement a magnetic field change or a change in the magnetic field orientation of the two magnet arrangements can be detected, which allows a unique position of the encoder element to be inferred. In particular, the design as a difference sensor guarantees a unique position detection of the encoder element, which is, for example, mechanically connected to an actuator element of an actuator whose position is to be monitored.

In particular, it is provided that the orientations of the magnet arrangements along the encoder element differ from each other. This reliably ensures a unique determination of the position of the encoder element in the direction of movement. Due to the fact that the orientations along the encoder element are different, the magnetic fields at the same level as the encoder element—viewed in the direction of movement—are aligned differently, which makes the unique position determination possible.

It is furthermore preferably provided that the magnet arrangements are implemented as magnetic tracks arranged on the encoder element. There, the magnet arrangements each extend over the encoder element in the form of tracks, in particular as straight lines, and can be reliably detected by the sensors in the direction of movement.

It is also preferably provided that the magnet arrangements are arranged next to each other on the encoder element. Thus, the magnet arrangements are arranged next to each other on one side of the encoder element, so that the sensors are assigned to the same side of the encoder element, in to detect the individual magnetic fields. As a result, a constructively simple and cost-effective encoder element is implemented.

The sensors are preferably each assigned to one of the magnet arrangements, so that each of the sensors monitors a different magnet arrangement or detects the magnetic fields of a different magnet arrangement. This reliably ensures an unambiguous evaluation of the magnetic fields.

It is preferably provided that the sensors are arranged next to one another in the direction of movement, so that they are positioned next to each other at the same level-viewed in the direction of movement—in order to detect the magnetic fields. This ensures a compact design of the sensor device. Alternatively, the sensors are preferably arranged offset relative to each other in the direction of movement, or spaced apart from each other, or at a specifiable measurement angle to the direction of measurement, to enable an accurate measurement result.

It is also preferably provided that the orientation of the magnetic fields changes incrementally or continuously. The incremental change of the alignment ensures a simple embodiment of each magnet arrangement, which is also inexpensive to produce. In particular, the respective magnet arrangement can be produced using a plurality of single magnets, which are arranged one behind the other. The continuous change of the alignment of the magnetic fields allows a higher resolution of the sensor device and thus an accurate determination of position, and is possible and preferably provided, for example, by means of a helical magnetization of a magnetic body.

It is additionally preferably provided that the respective magnet arrangement is formed of a plurality of magnet elements. As already mentioned, a cost-effective implementation of the respective magnet arrangement is possible with, in particular, an incremental change of the orientation of the magnetic fields. The magnetic elements are preferably arranged on a base body of the encoder element, for example, adhesively bonded or fixed on the base body in a positive-locking or friction-locking manner. The individual magnetic elements can be positioned directly in contact with each other or spaced apart in relation to each other, so that a gap, in particular an air gap, exists between them.

It is additionally preferably provided that each magnet arrangement is formed of a differently magnetized magnetic field body. This means that each magnet arrangement is produced integrally from one magnetic field encoder or magnetic field body, which in particular due to the advantageous magnetization, exhibits a change in the orientation of the magnetic fields along its longitudinal extension, or in the direction of movement of the encoder element.

According to a particularly preferred embodiment of the disclosure it is provided that the magnet arrangements are formed from a single magnetized magnetic field body. This enables a particularly compact encoder element to be implemented. According to a further embodiment, the sensor device or the encoder element has more than two magnet arrangements with differently oriented magnetic fields along the direction of movement.

Particularly preferably, the encoder element is mounted such that it is linearly displaceable. To this end the sensor device advantageously has a housing in which the encoder element is displaceably mounted, and which supports the sensors. According to an alternative embodiment of the disclosure it is preferably provided that the encoder element is rotatably mounted in the housing, wherein the magnet arrangements then preferably extend over the outer circumference of an, in particular circular, main body of the encoder element in the circumferential direction. The sensor device is then advantageously able to detect both a linear movement and/or position as well as a rotary movement and/or position (angular position).

BRIEF DESCRIPTION OF THE DRAWINGS

In the following the disclosure will be explained in further detail by reference to the drawings. The single FIGURE shows an advantageous sensor device in a simplified representation.

DETAILED DESCRIPTION

The FIGURE shows a simplified perspective view of a sensor device 1, which has an encoder element 2 and two sensors 3. Furthermore, the sensor device 1 has a housing 4, which is only partially shown in this drawing. On the one hand the housing 4 is used to mount the movable encoder element 2 and on the other hand to hold the sensors 3, so that the encoder element 2 is movable relative to the stationary or housing-affixed sensors 3. In accordance with the present exemplary embodiment it is provided that the encoder element 2 can be moved in a linear or translational manner in the housing 4, as shown by a double-headed arrow 5. The encoder element 2 in this case is designed substantially rod-shaped and is moveable in its longitudinal extension in the housing 4 in accordance with the arrow 5.

The encoder element 2 has a first magnet arrangement 6 and a second magnet arrangement 7, each of which form a magnetic track. The magnetic tracks lie side by side in the direction of movement of the encoder element 2. Each magnet arrangement 6, 7, in accordance with this exemplary embodiment has a plurality of magnetic elements 6_1, 6_2, 6_3 and 6_4 and 7_1, 7_2, 7_3 and 7_4. The magnetic elements 6_1 to 7_4 are preferably directly fixed to each other, for example adhesively bonded, or fixed to an optional common main body 8, which is shown only by dashed lines in the FIGURE.

The magnetic elements 6_1 to 7_4 are designed and configured in such a way that each magnet arrangement 6, 7, viewed in the direction of movement, has magnetic fields of different orientation, as indicated in the FIGURE by arrows. The orientations of the adjacent magnet arrangements 6 and 7 differ from each other, so that at the same level—viewed in the direction of movement of the encoder element 2—magnetic fields with different orientations are located next to each other.

The two sensors 3, viewed in the direction of movement, are arranged side by side, so that the one sensor 3 is assigned to the first magnet arrangement 6 and the second sensor 3 is assigned to the second magnet arrangement 7, to detect the respective magnetic field and its orientation.

A control unit, not shown here, monitors the output signals of the sensors 3 and combines them to form a sum signal or difference signal in order to determine the position of the encoder element 2 in relation to the sensors 3. Because the magnet arrangements 6, 7 have different orientations of the magnetic fields to each other, a unique position determination of the encoder element 6 can be performed with high accuracy. If the encoder element 2 is moved along the arrow 5 relative to the sensors 3, then the magnetic fields and magnetic field orientations detected by the sensors 3 from this exemplary embodiment change incrementally in accordance with the four magnetic elements 6_1 to 6_4 or 7_1 to 7_4.

According to an alternative exemplary embodiment, it is provided that the orientation of the magnetic fields changes continuously or in very small steps in the direction of movement, to ensure a high-resolution position determination. As an alternative to the magnet arrangements 6, 7 consisting of individual magnetic elements, it is also conceivable to provide one magnetic body for each magnet arrangement 6, 7, which is magnetized in such a way that it has a magnetic field which changes its orientation along the longitudinal extension. For example, the respective magnetic body is magnetized in a helical configuration.

The sensors 3 are designed in particular as Hall or XMR sensors, and determine in particular the angular difference between the magnetic fields at the measurement point of the sensors 3, which as has already been said, are arranged next to each other or transverse to the measurement direction.

According to a further exemplary embodiment, not shown here, it is provided that the encoder element 2 is not rod-shaped, but in the shape of a circular disk or circular ring, wherein the magnet arrangements 6, 7 extend over the outer circumference of the encoder element in the circumferential direction, so that by means of the encoder element 6 a rotary movement or rotary angle position can be detected.

The invention claimed is:

1. A sensor device, comprising:
   an encoder element configured to be displaced in a direction of movement and including:
      a first magnet arrangement having a first plurality of differently aligned magnetic fields along the direction of movement of the encoder element; and
      a second magnet arrangement having a second plurality of differently aligned magnetic fields along the direction of movement of the encoder element; and
   at least two magnetic field-sensitive sensors affixed to a housing of the sensor device, the at least two magnetic field-sensitive sensors including:
      a first sensor assigned to the first magnet arrangement and configured to generate a first output signal, and
      a second sensor assigned to the second magnet arrangement and configured to generate a second output signal, the first and second output signals monitored and combined to form a differential signal configured to determine at least one of a position and a movement of the encoder element.

2. The sensor device as claimed in claim 1, wherein first orientations of the first plurality of differently aligned magnetic fields and second orientations of the second plurality of differently aligned magnetic fields differ from each other along the encoder element.

3. The sensor device as claimed in claim 1, wherein the first magnet arrangement and the second magnet arrangement are configured as magnetic tracks arranged on the encoder element.

4. The sensor device as claimed in claim 1, wherein the first magnet arrangement and the second magnet arrangement are arranged next to each other on one side of the encoder element.

5. The sensor device as claimed in claim 1, wherein the first and second sensors, viewed in the direction of movement of the encoder element, are arranged next to each other.

6. The sensor device as claimed in claim 1, wherein first orientations of the first plurality of differently aligned magnetic fields and second orientations of the second plurality of differently aligned magnetic fields change incrementally.

7. The sensor device as claimed in claim 1, wherein:
the first magnet arrangement includes a first plurality of magnetic elements; and the second magnet arrangement includes a second plurality of magnetic elements.

8. The sensor device as claimed in claim 1, wherein each of the first magnet arrangement and the second magnet arrangement is formed from a differently magnetized magnetic field body.

9. The sensor device as claimed in claim 1, wherein the first magnet arrangement and the second magnet arrangement are formed from a single magnetized magnetic field body.

10. The sensor device as claimed in claim 2, wherein the first orientations of the first magnet arrangement do not repeat along the encoder element.

11. The sensor device as claimed in claim 10, wherein the second orientations of the second magnet arrangement do not repeat along the encoder element.

12. The sensor device as claimed in claim 1, wherein the first magnet arrangement and the second magnet arrangement abut one another and are arranged on one side of the encoder element.

13. The sensor device as claimed in claim 1, wherein the first and second sensors, viewed in the direction of movement of the encoder element, are arranged offset relative to each other in the direction of movement.

14. The sensor device as claimed in claim 1, wherein the first and second sensors, viewed in the direction of movement of the encoder element, are arranged at a specifiable angle to a measurement direction.

15. The sensor device as claimed in claim 1, wherein first orientations of the first plurality of differently aligned magnetic fields and second orientations of the second plurality of differently aligned magnetic fields change continuously.

* * * * *